(12) United States Patent
Li et al.

(10) Patent No.: US 12,475,299 B2
(45) Date of Patent: Nov. 18, 2025

(54) METHOD FOR GENERATING TARGET OBJECT, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yukun Li, Beijing (CN); Han Zhang, Beijing (CN); Weichong Yin, Beijing (CN); Dongling Xiao, Beijing (CN); Yu Sun, Beijing (CN); Hao Tian, Beijing (CN)

(73) Assignee: BEIJING BAIDU NETCOM SCIENCE TECHNOLOGY CO., LTD, Beijing (CN)

( * ) Notice: Subject to any disclaimer, the term of this patent is extended or adjusted under 35 U.S.C. 154(b) by 649 days.

(21) Appl. No.: 17/835,717

(22) Filed: Jun. 8, 2022

(65) Prior Publication Data
US 2022/0300697 A1  Sep. 22, 2022

(30) Foreign Application Priority Data
Jun. 30, 2021 (CN) .......................... 202110736097.2

(51) Int. Cl.
G06K 9/46 (2006.01)
G06F 40/12 (2020.01)
G06T 7/10 (2017.01)
G06T 11/60 (2006.01)

(52) U.S. Cl.
CPC ............... *G06F 40/12* (2020.01); *G06T 7/10* (2017.01); *G06T 11/60* (2013.01)

(58) Field of Classification Search
CPC .... G06F 40/12; G06F 16/538; G06F 16/5846; G06T 7/10; G06T 11/60; G06T 11/001; G06V 10/82; G06V 10/424; G06V 10/40; G06V 10/467
See application file for complete search history.

(56) References Cited

U.S. PATENT DOCUMENTS

| 8,452,112 B2 * | 5/2013 | Kajiwara ............. G06V 30/413 |
| | | 382/233 |
| 2019/0347357 A1* | 11/2019 | Murali ................ G06F 16/5866 |
| 2020/0184316 A1* | 6/2020 | Kavukcuoglu ..... H03M 7/3082 |
| 2021/0174162 A1 | 6/2021 | Le et al. |

OTHER PUBLICATIONS

Office Action for Japanese Application No. 2022-010858, dated Mar. 7, 2023, 8 pages.
Ding, Ming et al., "CogView: Mastering Text-to-Image Generation via Transformers"; Nov. 5, 2021; 35th Conference on Neural Information Processing Systems (NeurIPS 2021); 21 pages.

* cited by examiner

*Primary Examiner* — Duy M Dang
(74) *Attorney, Agent, or Firm* — Lippes Mathias LLP (57) ABSTRACT

A method for generating a target object is provided. A first discrete encoded sequence corresponding to an original object is generated by performing discrete encoding on the original object. The original object is of an image type, a text type, or a text-image-combined type. A second discrete encode sequence is obtained by inputting the first discrete encoded sequence into a generative model. A target object is generated based on the second discrete encoded sequence. The target object is of an image type or a text type. When the original object is of the image type, the target object is of the text type. When the original object is of the text type, the target object is of the image type.

14 Claims, 5 Drawing Sheets

METHOD FOR GENERATING TARGET OBJECT, ELECTRONIC DEVICE, AND STORAGE MEDIUM

CROSS REFERENCE TO RELATED APPLICATIONS

This application claims priority and benefits to Chinese Application No. 202110736097.2, filed on Jun. 30, 2021, the entire content of which is incorporated herein by reference.

TECHNICAL FIELD

The disclosure relates to a field of computer technologies, more particularly to a field of artificial intelligence (AI) technologies, such as natural language processing and deep learning, and more particularly to a method and an apparatus for generating a target object, an electronic device, and a storage medium.

BACKGROUND

At present, there are many scenarios for generating a text based on an image, or generating an image based on a text, or generating an image or a text based on a combination of a text and an image. For example, a text capable of describing the content of an image can be generated based on the image, to describe the content represented by the image. An image capable of representing the content described by a text can be generated based on the text to illustrate the content described by the text. A text can be generated based on a combination of a text and an image to describe the content represented by the image with a given keyword, and so on.

SUMMARY

According to one aspect of the disclosure, there is provided a method for generating a target object. The method includes: generating a first discrete encoded sequence corresponding to an original object by performing discrete encoding on the original object, in which the original object is of an image type, a text type, or a text-image-combined type; obtaining a second discrete encoded sequence by inputting the first discrete encoded sequence into a generative model; generating a target object based on the second discrete encoded sequence, in which the target object is of an image type or a text type, and when the original object is of an image type, the target object is of a text type, and when the original object is of a text type, the target object is of an image type.

According to another aspect of the disclosure, an electronic device is provided. The electronic device includes: at least one processor; and a memory communicatively coupled to the at least one processor. The memory stores instructions executable by the at least one processor. When the instructions are performed by the at least one processor, the at least one processor is caused to perform the method for generating the target object as described above.

According to another aspect of the disclosure, a non-transitory computer readable storage medium, having computer instructions stored therein is provided. The computer instructions are configured to cause a computer to perform the method for generating the target object as described above.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The embodiments of the disclosure are described as below with reference to the accompanying drawings, which include various details of embodiments of the disclosure to facilitate understanding, and should be considered as merely examples. Therefore, those skilled in the art should realize that various changes and modifications may be made on the embodiments described herein without departing from the scope and spirit of the disclosure. Similarly, for clarity and conciseness, descriptions of well-known functions and structures are omitted in the following descriptions.

It is understandable that, at present, there are many scenarios for generating a text based on an image, or generating an image based on a text, or generating an image or a text based on a combination of a text and an image. For example, a text capable of describing the content of an image can be generated based on the image, to describe the content represented by the image. An image capable of representing the content described by a text can be generated based on the text to illustrate the content described by the text. A text can be generated based on a combination of a text and an image to describe the content represented by the image with a given keyword, and so on. However, in the related art, the method for generating a text or an image that can achieve the generation of a text from an image the generation of an image from a text has limited application scenes and a narrow application scope.

In view of the above problem, a method for generating a target object is provided. A first discrete encoded sequence corresponding to an original object is generated by performing discrete encoding on the original object. The original object is of an image type, a text type or a text-image-combined type. A second discrete encoded sequence is obtained by inputting the first discrete encoded sequence into a generative model. A target object is generated based on the second discrete encoded sequence. The type of the target object is of an image type or a text type. When the original object is of an image type, the target object is of a text type, and when the original object is of a text type, the target object is of an image type. Therefore, generation of the target image of the text type from the original object of the image type, generation of the target image of the image type from the original object of the text type, and generation of the target image of the image type from the original object of a text-image-combined type and generation of the target image of the text type from the original object of a text-image-combined type may be achieved by the same generative model, which extends an application scope of the generative model. For example, an object being of the image type refers to that the object is an image, an object being of the text type refers to that the object is a text, and an object being of a text-image-combined type refers to that the object is a combination of image and text.

It is be noted that, the method for generating a target object according to embodiments of the disclosure may be applied to various generation scenarios of an image from a text, a text from an image, an image or a text from a combination of an image and a text. For example, the method may be applied to a scenario where a text describing the content represented by an image is generated based on the image, a scenario where an image representing the content described by an text is generated based on the text; a scenario where a text describing the content represented by an image with a given keyword is generated; a scenario where a new image is drawn based on the given content of a text contained in an original image, a scenario where a text describing the content represented by an image is generated based on a given title and the image, or a scenario where comments on a given image are generated based on the given image, etc.

A method and an apparatus for generating a target object, an electronic device, a non-transitory computer-readable storage medium, and a computer program product according to the disclosure will be described below in combination with attached drawings.

Figure 1:
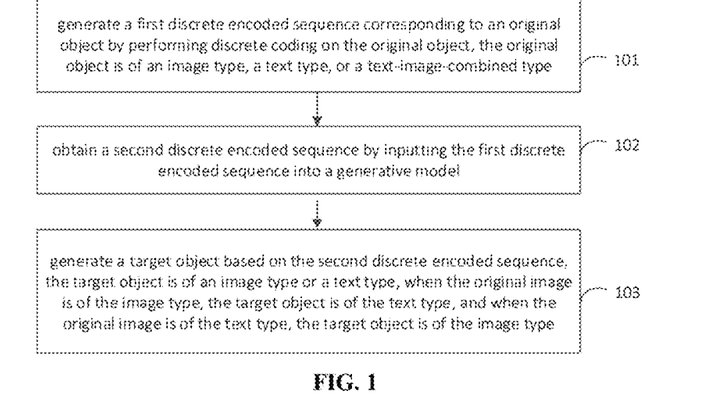
FIG. 1 is a flowchart illustrating a method for generating a target object according to a first embodiment of the disclosure.

In combination with FIG. 1, the method for generating a target object is described.

FIG. 1 is a flowchart illustrating a method for generating a target object according to a first embodiment of the disclosure. It is to be noted that, the method for generating a target object is executed by an apparatus for generating a target object, which is hereinafter referred to as a generating apparatus. The generating apparatus is for example an electronic device, or is included in an electronic device, to use the same generative model to achieve the generation of a text from an image, generation of an image from a text, generation of an image from a combination of a text and an image, and generation of a text from a combination of a text and an image, which extends an application scope of the generative model. Herein, the method will be described by taking that the generating apparatus is included in an electronic device as an example.

The electronic device may be any mobile computing device capable of performing data processing, such as a notebook computer, a smartphone, or a wearable device, or any stationary computer device capable of performing data processing, such as a desktop computer, or any other computer devices capable of performing data processing, such as a server, which is not limited in the disclosure.

As illustrated in FIG. 1, the method for generating a target object may include the following.

At block 101, a first discrete encoded sequence corresponding to an original object is obtained by performing discrete encoding on the original object. The original object is of an image type, a text type, or a text-image-combined type.

When the original object is of the image type, a preset image encoding method may be adopted to perform the discrete encoding on the original object to generate the first discrete encoded sequence corresponding to the original object. When the original object is of the text type, a preset text encoding method may be adopted to perform the discrete encoding on the original object to generate the first discrete encoded sequence corresponding to the original object. When the original object is of a text-image-combined type, the preset image encoding method and the preset text encoding method can be adopted respectively to perform the discrete encoding on an image part and a text part of the original object to generate a discrete encoded sequence corresponding to the image part of the original object and a discrete encoded sequence corresponding to the text part of original object. The first discrete encoded sequence is generated based on the discrete encoded sequence corresponding to the image part of the original object and the discrete encoded sequence corresponding to the text part of the original object.

At block 102, a second discrete encoded sequence is obtained by inputting the first discrete encoded sequence into a generative model.

The generative model is a parameter shared sequence-to-sequence (seqtoseq) framework. The input and output of the seqtoseq framework are all the discrete encoded sequences, such that the second discrete encoded sequence can be generated based on the first discrete encoded sequence.

At block 103, a target object is generated based on the second discrete encoded sequence. The target object is of an image type or a text type. When the type of the original object is one of an image and a text, the type of target object is the other one of a text and an image.

When the original object is of the image type, the target object is of the text type; when the original object is of the text type, the target object is of the image type; when the original object is of the text-image-combined type, the target object is of the image type or the text type.

In obtaining the target object of the text type, a preset text decoding method may be adopted to decode the second discrete encoded sequence, to convert the second discrete encoded sequence into the target object of the text type. In obtaining the target object of the image type, a preset image decoding mode may be adopted to decode the second discrete encoded sequence, to convert the second discrete encoded sequence into the target object of the image type.

Since the input and output of the generative model are all the discrete encoded sequences, for the original object of the image type, the text type, or the text-image-combined type, respective first discrete encoded sequences can be obtained by performing the discrete encoding, the respective second encoded sequences are obtained by inputting the first discrete encoded sequences into the generative model, and respective target objects are generated based on the second encoded sequences, thereby unifying the encoding manner of the original object and the decoding manner of the target object, which uses the same generative model to achieve generation of a text from an image, generation of an image from a text, generation of an image from a combination of text and image, and generation of a text from a combination of text and image, thereby extending an application scope of the generative model.

With the method for generating a target object according to embodiments of the disclosure, the first discrete encoded sequence corresponding to the original object is generated by performing discrete encoding on the original object. The original object is of an image type, a text type or a text-image-combined type. A second discrete encoded sequence is obtained by inputting the first discrete encoded sequence into the generative model. The target object is generated based on the second discrete encoded sequence. The target object is of an image type or a text type. When the original object is of the image type, the target object is of the text type. When the original object is of the text type, the target object is of the image type. Thus, generation of a text from an image, generation of an image from a text, generation of an image from a combination of text and image, and generation of a text from a combination of text and image may be achieved by the same generative model, which extends an application scope of the generative model.

When the original object is of the image type, the target object is of the text type. In combination with FIG. 2, the execution process of the method when the original object is of the image type and the target object is of the text type (for example, the original object is an image and the target object is a text) will be described.

Figure 2:
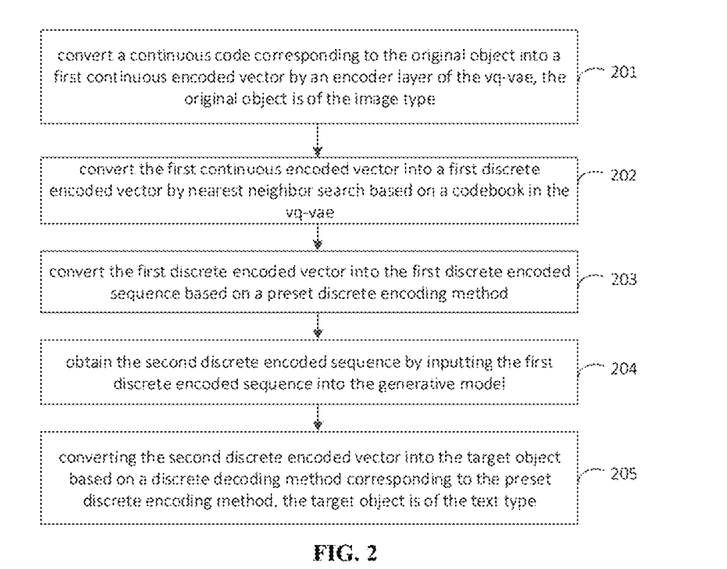
FIG. 2 is a flowchart illustrating a method for generating a target object according to a second embodiment of the disclosure.

FIG. 2 is a flowchart illustrating a method for generating a target object according to a second embodiment of the disclosure. As illustrated in FIG. 2, the method for generating a target object may include the following.

At block 201, a continuous encoding corresponding to the original object is converted into a first continuous encoded vector by an encoder layer of a vector quantized—variational autoencoder (vq-vae). The original object is of an image type.

At block 202, the first continuous encoded vector is converted into a first discrete encoded vector through nearest neighbor search based on a codebook in the vq-vae.

At block 203, the first discrete encoded vector is converted into the first discrete encoded sequence based on a preset discrete encoding method.

The vq-vae is an autoencoder that outputs discrete encoded vectors. The vq-vae includes an encoder layer and a decoder layer. Through the encoder layer, the image is encoded into a discrete encoded vector, and through the decoder layer, the discrete encoder vector is decoded into an image.

The encoder layer of the vq-vae is used to encoder the original object of the image type (e.g., the original object is an image) into the first discrete encoded sequence.

It is to be noted that, the pixel value of each pixel of an image may be the floating point type, rather than the integer type. In the disclosure, it can be considered that the image whose pixel value is the floating point type is continuous RGB encoding, and the image whose pixel value is the integer type sequence is discrete encoding. The continuous encoding corresponding to the original object of the image type needs to be converted into the first discrete encoded sequence.

Figure 3:
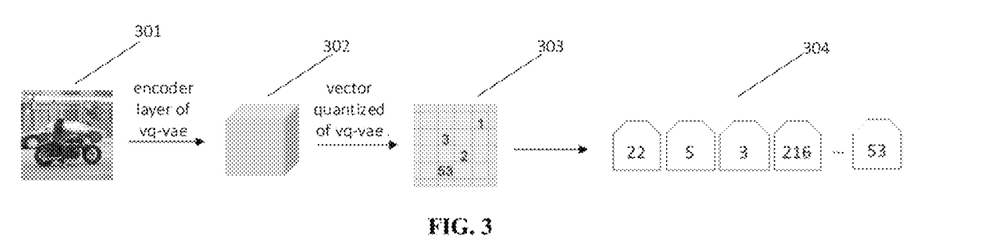
FIG. 3 is a schematic diagram illustrating a method for generating a target object according to a second embodiment of the disclosure.

In an example, as illustrated in FIG. 3, the encoder layer of the vq-vae may be used to convert a continuous encoding 301 corresponding to the original object into a first continuous encoded vector 302. The first continuous encoded vector 302 is converted into the first discrete encoded vector 303 through the nearest neighbor search based on a codebook in the vq-vae. The first discrete encoded vector 303 is converted into the first discrete encoded sequence 304 through a preset discrete encoding method.

The codebook is a K×D-dimensional codebook maintained in the vq-vae. For example, the codebook includes K encoded vectors $e_1, e_2 \ldots e_K$, where the dimension of each encoded vector is D. The encoder layer of the vq-vae may be used to convert the continuous encoding of the original object of the image type into a H'×W'×D first continuous encoded vector. For each D-dimensional vector of the H'×W' D-dimensional vectors, an encoded vector $e_i$ closest to the D-dimensional vector may be found in the codebook, where $e_i$ is an encoded vector in the codebook and the D-dimensional vector is represented by an index of the encoded vector $e_i$, to obtain a H'×W' first discrete encoded vector 303, where, K, D, H' and W' represent the dimension respectively.

After the H'×W' first discrete encoded vector is obtained, the H'×W' first discrete encoded vector is converted into the first discrete encoded sequence based on a preset discrete encoding method. The preset discrete encoding method may be set as required, such as a one-hot encoding method or any other methods, which is not limited in the disclosure. The disclosure will be described by taking the one-hot encoding method as an example.

The codebook may adopt the one-hot encoding method. By looking up the codebook, H'×W' first discrete encoded vector 303 as illustrated in FIG. 3 is converted into another H'×W' discrete encoded vector that is encoded by the codebook adopting the one-hot encoding method. The first discrete encoded sequence 304 is obtained based on another H'×W' discrete encoded vector. For example, after a 3×3 first discrete encoder vector is converted into another 3×3 discrete encoder vector that is encoded by a codebook adopting the one-hot encoding method, a 1×9 first discrete encoded sequence may be obtained based on each element in the another 3×3 discrete encoded vector.

Through the above process, the discrete encoding may be performed on the original object of the image type based on the vq-vae, to generate the first discrete encoded sequence corresponding to the original object, which lays a foundation for generation of the target object of the text type from the original object of the image type by the generative model.

It is to be noted that, the original object, the first continuous encoded vector, the first discrete encoded vector, and the first discrete encoded sequence described in combination with FIG. 3 are merely examples and should not be construed as a limitation of the disclosure.

At block 204, a second discrete encoded sequence is obtained by inputting the first discrete encoded sequence into a generative model.

The generative model is based on a parameter shared seqtoseq framework, such as a transformer generative model in a natural language processing (NLP) field. The input and output of the seqtoseq framework are all discrete encoded sequences, such that the second discrete encoded sequence can be obtained based on the first discrete encoded sequence.

Before inputting the first discrete encoded sequence into the generative model to obtain the second discrete encoded sequence, the generative model may be trained. The training process is described below, which is not repeated here.

At block 205, the second discrete encoded sequence is converted into the target object based on a discrete decoding method corresponding to the preset discrete encoding method. The target object is of a text type.

The discrete decoding method corresponds to the one-hot encoding method or any other encoding methods, which is not limited in the disclosure. The process of converting the second discrete encoded sequence into the target object based on the discrete decoding method corresponding to the preset discrete encoding method is the same as an existing text decoding method in the related art, which is not repeated here.

With the above process, the second discrete encoded vector is converted into the target object of the text type. In addition, by converting the original object of the image type into the first discrete encoded sequence based on the preset discrete encoding method, and converting the second discrete encoded sequence into the target object using the discrete encoding method corresponding to the preset discrete encoding method, the application of the discrete encoding method of the text into the encoding process of the image is realized, thereby unifying the encoding method of a text and the encoding method of an image.

With the method for generating a target object according to embodiments of the disclosure, the continuous code corresponding to the original object is converted into the first continuous encoded vector by the encoder layer of the vq-vae. The original object is of the image type. The first continuous encoded vector is converted into the first discrete encoded vector through the nearest neighbor search based on the codebook of the vq-vae. The first discrete encoded vector is converted into the first discrete encoded sequence based on the preset discrete encoding method. The second discrete encoded sequence is obtained by inputting the first discrete encoded vector into the generative model. The second discrete encoded sequence is converted into the target object through the discrete decoding method corresponding to the preset discrete encoding method. The target object is of the text type. Therefore, when the original object is of the image type and the target object is of the text type, after the discrete encoding is performed on the original object of the image type based on the vq-vae, the second discrete encoded sequence is obtained through the generative model, and the target object is generated based on the second discrete encoded sequence, which achieves generation of a text from an image, and extends an application scope of the generative model.

In the disclosure, the original object can be of a text type and the target object is thus of an image type. In combination with FIG. 4, the execution process of the method when the original object is of the text type and the target object is of the image type is further described.

Figure 4:
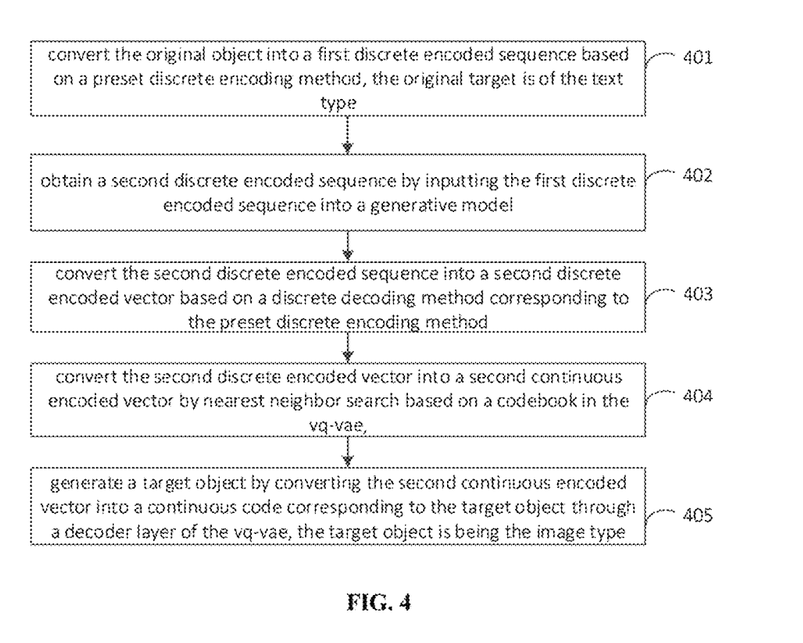
FIG. 4 is a flowchart illustrating a method for generating a target object according to a third embodiment of the disclosure.

FIG. 4 is a flowchart illustrating a method for generating a target object according to a third embodiment of the disclosure. As illustrated in FIG. 4, the method for generating a target object may include the following.

At block 401, an original object is converted into a first discrete encoded sequence based on a preset discrete encoding method. The original object is of a text type.

The preset discrete encoding method may be the one-hot encoding method or any other encoding method, which is not limited in the disclosure. The process of converting the original object into the first discrete encoded sequence based on the preset discrete encoding method is the same as an existing text encoding method in the related art, which is not repeated here. The disclosure will be described by taking the one-hot encoding method as an example.

With the above process, the first discrete encoded sequence is obtained by performing the discrete encoding on the original object of the text type, which lays a foundation for generation of an image from a text by the generative model.

At block 402, a second discrete encoded sequence is obtained by inputting the first discrete encoded sequence into a generative model.

The detailed implementation process and principle of the block 402 are the same as descriptions of the above embodiments, which are not repeated here.

Before inputting the first discrete encoded sequence into the generative model to obtain the second discrete encoded sequence, the generative model may be trained. The specific training process will be described below, which is not repeated here.

At block 403, the second discrete encoded sequence is converted into a second discrete encoded vector based on a discrete decoding method corresponding to the preset discrete encoding method.

The discrete decoding method corresponding to the preset discrete encoding method may be the one-hot encoding method or any other encoding methods, which is not limited in the disclosure.

At block 404, the second discrete encoded vector is converted into a second continuous encoded vector through a nearest neighbor search based on a codebook in the vq-vae.

At block 405, the target object is generated by converting the second continuous encoded vector into a continuous code corresponding to the target object by a decoder layer of the vq-vae. The target object is of an image type.

It is understandable that, the vq-vae includes an encoder layer and a decoder layer. An image may be encoded into a discrete encoded vector by the encoder layer, and a discrete encoded vector may be decoded into an image by the decoder layer.

The decoder layer of the vq-vae can be used to generate the target object based on the second discrete encoded sequence.

Figure 5:
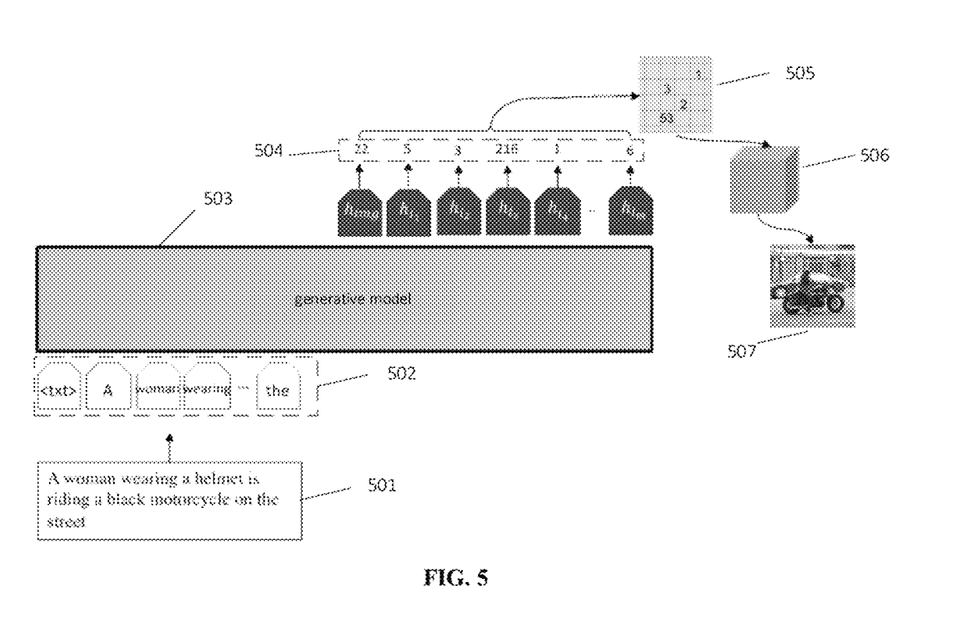
FIG. 5 is a schematic diagram illustrating a method for generating a target object according to a third embodiment of the disclosure.

In an example, as illustrated in FIG. 5, after the first discrete encoded sequence 502 is obtained by performing the discrete encoding on the original object 501 of the text type, the second discrete encoded sequence 504 may be obtained by inputting the first discrete encoded sequence 502 into the generative model 503. In FIG. 5, $h_{img}$, $h_{i1}$, $h_{i2}$, $h_{i3}$, $h_{i4}$ . . . $h_{im}$ represent hidden states to be predicted.

Further, the process of generating the target object 507 of the image text based on the second discrete encoded sequence 504 can be considered as an inverse of the process of obtaining the first discrete encoded sequence corresponding to the original object of the image type by performing the discrete encoding on the original object based on the vq-vae.

The second discrete encoded sequence 504 may be converted into a H'×W' discrete encoded vector that is encoded by a codebook adopting the one-hot encoding method. The H'×W' discrete encoded sequence is converted into a H'×W' second discrete encoded vector 505 that is obtained by encoding the indexes of encoded vectors contained in the codebook of the vq-vae.

Based on the codebook in the vq-vae, performing the nearest neighbor search can convert the H'×W' second discrete encoded vector 505 into a H'×W'×D second continuous encoded vector 506. The second continuous encoded vector 506 is converted into a continuous code corresponding to the target object by the decoder layer of the vq-vae and the target object 507 is generated.

It is to be noted that, the original object, the first continuous encoded vector, the first discrete encoded vector, the first discrete encoded sequence in FIG. 5 are merely examples and cannot be construed as a limitation of the disclosure.

With the above process, the second discrete encoded vector is converted into the target object of the image type. By converting the original object of the text type into the first discrete encoded sequence through the preset discrete encoding method, and by converting the second discrete encoded sequence into the target object through the discrete decoding method corresponding to the preset discrete encoding method, applying the discrete decoding method of a text to the decoding process of an image is realized, thereby unifying the decoding method of a text and the decoding method of an image.

With the method for generating a target object according to embodiments of the disclosure, the original object is converted into the first discrete encoded sequence through the preset discrete encoding method, the original object of the text type, the second discrete encoded sequence is obtained by inputting the first discrete encoded sequence into the generative model, the second discrete decoded sequence is converted into the second discrete encoded vector through the discrete decoding method corresponding to the preset discrete encoding method, the second discrete encoded vector is converted into the second continuous encoded vector through the nearest neighbor search based on the codebook of the vq-vae, and the target object is obtained by converting the second continuous encoded vector into the continuous code corresponding to the target object through the decoder layer of the vq-vae. The target object is of the image type. Therefore, when the original object is of the text type and the target object is of the image type, the target object of the image type is generated by decoding through the vq-vae, the second discrete encoded sequence output by the generative mode, the generation of an image from a text is realized and an application scope of the generative model is extended.

The original object may be of a text-image-combined type and thus the target object may be of an image type or a text type. In combination with FIG. 6, the execution process of the method for generating a target object when the original object is of the text-image-combined type and the target object is of the image type of the text type is further described.

Figure 6:
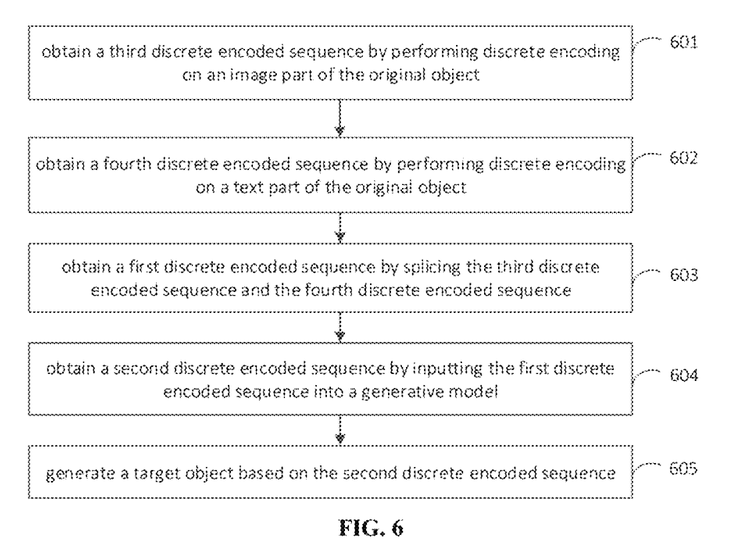
FIG. 6 is a flowchart illustrating a method for generating a target object according to a fourth embodiment of the disclosure.

FIG. 6 is a flowchart illustrated a method for generating a target object according to a fourth embodiment of the disclosure. As illustrated in FIG. 6, when the original object is of the text-image-combined type and the target object is of the image type or the text type, the method for generating a target object may include the following.

At block 601, a third discrete encoded sequence is obtained by performing discrete encoding on an image part of the original object.

At block 603, a fourth discrete encoded sequence is obtained by performing discrete encoding on a text part of the original object.

The process of performing the discrete encoding on the image part of original object is the same as the process of performing the discrete encoding on the original object of the image type, and the process of performing the discrete encoding on the text part of the original object is the same as the process of performing the discrete encoding on the original object of the text type, which are not repeated here.

At block 603, the first discrete encoded sequence is obtained by splicing the third discrete encoded sequence and the fourth discrete encoded sequence.

For example, the third discrete encoded sequence is a 1×5 discrete encoded sequence, the fourth discrete encoded sequence is a 1×4 discrete encoded sequence. The third discrete encoded sequence and the fourth discrete encoded sequence may be spliced into a 1×9 first discrete encoded sequence.

It is to be noted that, the splicing manner of splicing the third discrete encoded sequence and the fourth discrete encoded sequence may be set in advance based on the type of the target object. For example, when the target object is of the image type, the splicing manner of splicing the third discrete encoded sequence and the fourth discrete encoded sequence is to splice the fourth discrete encoded sequence behind the third discrete encoded sequence. When the target object is of the text type, the splicing manner of splicing the third discrete encoded sequence and the fourth discrete encoded sequence is to splice the third discrete encoded sequence behind the fourth discrete encoded sequence. Therefore, the third discrete encoded sequence and the fourth discrete encoded sequence may be spliced based on the type of the target object.

At block 604, a second discrete encoded sequence is obtained by inputting the first discrete encoded sequence into a generative model.

At block 605, a target object is generated based on the second discrete encoded sequence.

The target object is of an image type or a text type.

Figure 7:
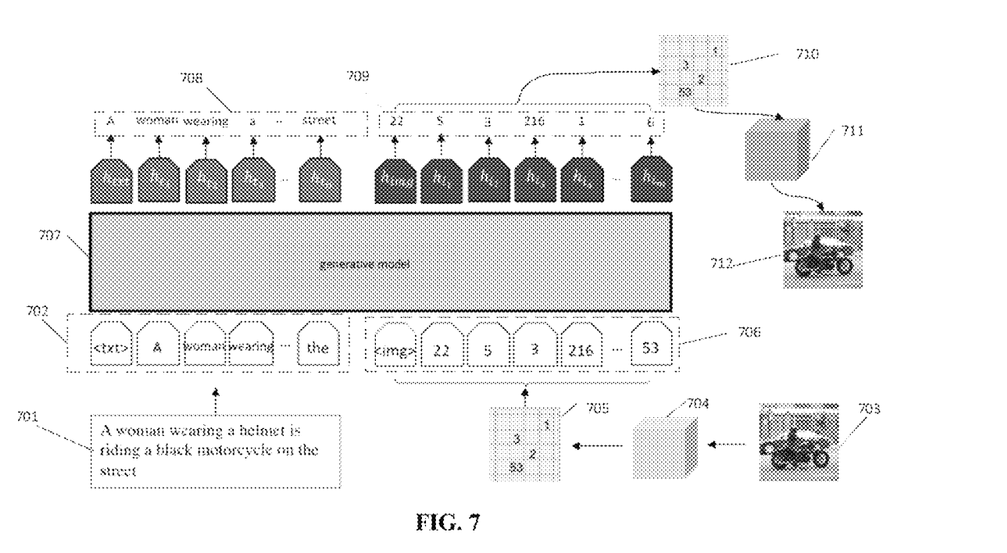
FIG. 7 is a schematic diagram illustrating a method for generating a target object according to a fourth embodiment of the disclosure.

As illustrated in FIG. 7, when the original object is of the text-image-combined type, for the text part of the original object 701, the image part of the original object is converted into the fourth discrete encoded sequence 702 through the preset discrete encoding method. It is to be noted that, for the convenience of understanding, in FIG. 7, the word vectors obtained after performing the word segmentation on the original object are the fourth discrete encoded sequence. For the image part of the original object 703, the third discrete encoded sequence 706 is obtained by performing the discrete encoding on image part of the original object 703 as follows. The continuous code corresponding to the image part of the original object is converted into the first continuous encoded vector 704 by an encoder layer of the vq-vae, the first discrete encoded vector 706 is converted into the first discrete encoded vector 705 through the nearest neighbor search based on the codebook in the vq-vae, and the first discrete encoded vector 705 is converted into the third discrete encoded sequence 706 through the preset discrete encoding method. The third discrete encoded sequence 706 can be spliced with the fourth discrete encoded sequence 702 to obtain the first discrete encoded sequence, and the second discrete encoded sequence is obtained by inputting the first discrete encoded sequence into the generative model 707.

When the target object is of the text type, as illustrated in FIG. 7, the second discrete encoded sequence output by the generative model is a discrete encoded sequence 708, and the discrete encoded sequence 708 is converted into the target object based on the discrete decoding method corresponding to the preset discrete encoding method.

When the target object is of the image type, as illustrated in FIG. 7, the second discrete encoded sequence output by the generative model is the discrete encoded sequence 709, and the target object is generated based on the discrete encoded mode 709 as follows. the discrete encoded sequence 709 is converted into the second discrete encoded vector 710 based on the discrete decoding method corresponding to the preset discrete encoding method, and the second discrete encoded vector 710 is converted into the second continuous encoded vector 711 through the nearest neighbor search based on the codebook of the vq-vae, and the target object 712 is generated by converting the second continuous encoded vector 711 into the continuous code corresponding to the target object through the decoder layer of the vq-vae.

It is to be noted that, the original object, the first continuous encoded vector, the first discrete encoded vector, the first discrete encoded sequence in FIG. 7 are merely examples and cannot be construed as a limitation of the disclosure.

When the original object is of the text-image-combined type, the discrete encoding is performed on the image part and the text part of the original object respectively to obtain the third discrete encoded sequence and the fourth discrete encoded sequence. The third discrete encoded sequence and the fourth discrete encoded sequence are spliced to obtain the first discrete encoded sequence. The first discrete encoded sequence is input into the generative model to obtain the second discrete encoded sequence. The target object is generated based on the second discrete encoded sequence. The generation of an image or a text from a combination of image to text is realized and an application scope of the generative model is extended.

Before the second discrete encoded sequence is obtained by inputting the first discrete encoded sequence into the generative model, the generative model may be trained. Before the block 604, the method may further include: acquiring training data including multiple sample pairs, each sample pair includes a discrete encoded sequence sample corresponding to a sample text and a discrete encoded sequence sample corresponding to a sample image, and there is an image-text conversion relationship between the sample text and the sample image; acquiring an initial generative model; obtaining a predicted discrete encoded sequence corresponding to the sample text and a predicted discrete encoded sequence corresponding to the sample image by inputting the sample pairs into the initial generative model; and obtaining the generative model by adjusting model parameters of the initial generative model based on a first difference between the predicted discrete encoded sequence corresponding to the sample text and the discrete encoded sequence sample corresponding to the sample image, and a second difference between the predicted discrete encoded sequence corresponding to the sample image and the discrete encoded sequence sample corresponding to the sample text.

The process of obtaining the discrete encoded sequence sample corresponding to the sample text by performing the discrete encoding on the sample text, and the process of obtaining the discrete encoded sequence sample corresponding to the sample image by performing the discrete encoding on the sample image are the same as the description of the above embodiments, which are not repeated here.

The initial generative model may be based on a parameter shared seqtoseq framework, such as a transformer generative model.

The initial generative model can be trained for example by the deep learning, which outperforms other machine learning methods on the aspect of big data set.

In training the initial generative model by the deep learning, one or more sample pairs in the training data may be input into the initial generative model, such that when the target object to be obtained is the sample image in the sample pair, the predicted discrete encoded sequence corresponding to the sample text can be obtained, and when the target object to be obtained is the sample text in the sample pair, the predicted secrete encoded sequence corresponding to the sample image can be obtained. The first difference between the predicted discrete encoded sequence corresponding to the sample text when the target object to be obtained is the sample image and the discrete encoded sequence sample corresponding to the sample image is obtained, and the second difference between the predicted discrete encoded sequence corresponding to the sample image when the target object to be obtained in the sample text and the discrete encoded sequence sample corresponding to the sample text is obtained. The model parameters of the initial generative mode are adjusted based on the first difference and the second difference to obtain an adjusted generative model.

Different one or more sample pairs in the training data may be input into the adjusted generative model to acquire the predicted discrete encoded sequence corresponding to the sample text when the target object to be obtained is the sample image and the predicted discrete encoded sequence corresponding to the sample image when the target object to be obtained is the sample text. The first difference between the predicted discrete encoded sequence corresponding to the sample text when the target object to be obtained is the sample image and the discrete encoded sequence sample corresponding to the sample image is obtained, and the second difference between the predicted discrete encoded sequence corresponding to the sample image when the target object to be obtained is the sample text and the sample discrete encoded sequence corresponding to the sample text is obtained. The model parameters of the adjusted generative model are adjusted based on the first difference and the second difference, to obtain a further adjusted generative model.

Thus, the initial generative model may be iteratively trained by continuously adjusting the model parameters of the initial generative model until the accuracy of the predicted discrete encoded sequence output by the generative model meets a preset threshold, to obtain a trained generative model.

After the trained generative model is obtained, the trained generative model may be used to obtain the second discrete encoded sequence based on the first discrete encoded sequence corresponding to the original object of the image type, the text type, or the text-image-combined type.

Since the training data is the sample pair including the discrete encoded sequence sample corresponding to the sample text and the discrete encoded sequence sample corresponding to the sample image having the image-text conversion relationship with the sample text, and the generative model is trained by the deep learning, the trained generative model may achieve the generation of an image from a text, the generation of a text from an image, and the generation of an image from a combination of image and text and the generation of a text from a combination of image and text.

Figure 8:
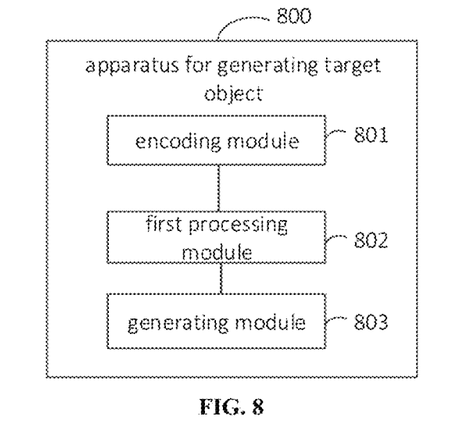
FIG. 8 is a block diagram illustrating an apparatus for generating a target object according to a fifth embodiment of the disclosure.

In combination with FIG. 8, the apparatus for generating a target object according to embodiments of the disclosure is described.

FIG. 8 is a block diagram illustrating an apparatus for generating a target object according to a fifth embodiment of the disclosure.

As illustrated in FIG. 8, the apparatus 800 includes an encoding module 801, a first processing module 802 and a generating module 803.

The encoding module 801 is configured to obtain a first discrete encoded sequence corresponding to an original object by performing discrete encoding on the original object.

The original object is of an image type, a text type, or a text-image-combined type.

The first processing module 802 is configured to obtain a second discrete encoded sequence by inputting the first discrete encoded sequence into a generative model.

The generating module 803 is configured to obtain a target object based on the second discrete encoded sequence. The target object is of an image type or a text type. When the original object is of the image type, the target object is of the text type. When the original object is of the text type, the target object is of the image type.

It is to be noted that, the apparatus for generating a target object according to embodiments of the disclosure may perform the method for generating a target object described in the above embodiments. The apparatus for generating a target object may be an electronic device, or included in an electronic device, to achieve the generation of an image from a text, the generation of a text from an image, and generation of an image from a combination of image and text, and the generation of a text from a combination of image and text by the same generative model, which extends an application scope of the generative model.

The electronic device may be any mobile computing device capable of performing data processing, such as a notebook computer, a smartphone, a wearable device, or any stationary computing device capable of performing data processing such as a desktop computer or a server, or other types of computing devices capable of performing data processing, which is not limited in the disclosure.

It is to be noted that the foregoing explanations of the method for generating a target object are also applied to an apparatus for generating a target object, which will not be repeated here.

With the apparatus for generating a target object according to embodiments of the disclosure, the first discrete encoded sequence corresponding to the original object is obtained by performing the discrete encoding on the original object. The original object is of the image type, the text type, or the text-image-combined type. The second discrete encoded sequence is obtained by inputting the first discrete encoded sequence into the generative model. The target object is generated based on the second discrete encoded sequence. The target object is of an image type or a text type. When the original object is of the image type, the target object is of the text type. When the original object is of the text type, the target object is of the image type. Therefore, the generation of an image from a text, the generation of a text from an image, the generation of an image from a combination of text and image, and the generation of a text from a combination of text and image can be achieved by the same generative model, which extends an application scope of the generative model.

Figure 9:
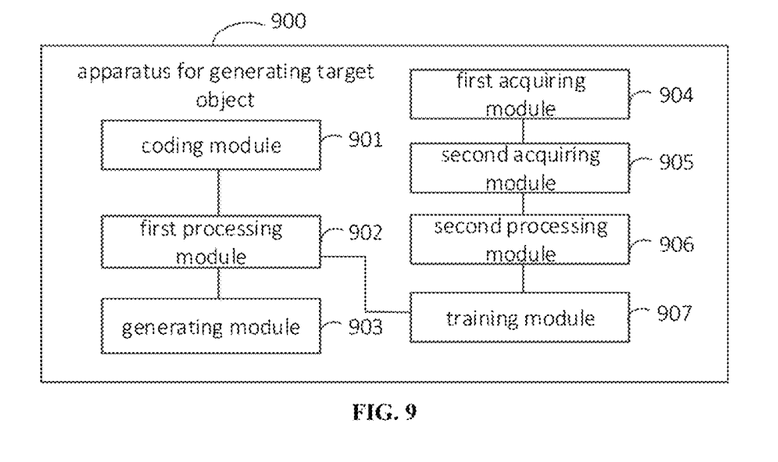
FIG. 9 is a block diagram illustrating an apparatus for generating a target object according to a sixth embodiment of the disclosure.

In combination with FIG. 9, the apparatus for generating a target object according to embodiments of the disclosure is described.

FIG. 9 is a block diagram illustrating an apparatus for generating a target object according to a sixth embodiment of the disclosure.

As illustrated in FIG. 9, the apparatus 900 for generating a target object includes an encoding module 901, a first processing module 902 and a generating module 903. The encoding module 901, the first processing module 902 and the generating module 903 in FIG. 9 have the same function and structure as the encoding module 801, the first processing module 802 and the generating module 803 in FIG. 8.

When the original object is of the image type, the encoding module 901 includes a first converting unit, a second converting unit, and a third converting unit.

The first converting unit is configured to convert a continuous code corresponding to the original object into a first continuous encoded vector by adopting an encoder layer of a vq-vae.

The second converting unit is configured to convert the first continuous encoded vector into a first discrete encoded vector through nearest neighbor search based on a codebook in the vq-vae.

The third converting unit is configured to convert the first discrete encoded vector into a first discrete encoded sequence based on a preset discrete encoding method.

When the target object is of the text type, the generating module 902 includes a fourth converting unit.

The fourth converting unit is configured to convert the second discrete encoded vector into the target object based on a discrete decoding method corresponding to the preset discrete encoding method.

When the original object is of the text type, the encoding module 901 includes a fifth converting unit.

The fifth converting unit is configured to convert the original object into the first discrete encoded sequence based on a preset discrete encoding method.

When the target image is of the image type, the generating module 902 includes a sixth converting unit, a seventh converting unit, and an eighth converting unit.

The sixth converting unit is configured to convert the second discrete encoded sequence into a second discrete encoded vector based on a discrete decoding method corresponding to the preset discrete encoding method.

The seventh converting unit is configured to convert the second discrete encoded vector into a second continuous encoded vector through the nearest neighbor search based on a codebook in the vq-vae.

The eighth converting unit is configured to generate the target object by converting the second continuous encoded vector into a continuous code corresponding to the target object through a decoder layer of the vq-vae.

When original object is of the text-image-combined type, the encoding module 901 includes a first encoding unit, a second encoding unit, and a splicing unit.

The first encoding unit is configured to obtain a third discrete encoded sequence by performing discrete encoding on an image part of the original object.

The second encoding unit is configured to obtain a fourth discrete encoded sequence by performing discrete encoding on a text part of the original object.

The splicing unit is configured to obtain the first discrete encoded sequence by splicing the third discrete encoded sequence and the fourth discrete encoded sequence.

The apparatus 900 for generating a target object further includes a first acquiring module 904, a second acquiring module 905, a second processing module 906, and a training module 907.

The first acquiring module 904 is configured to acquire training data. The training data includes multiple sample pairs. Each of the sample pairs includes a discrete encoded sequence sample corresponding to a sample text and a discrete encoded sequence sample corresponding to a sample image. There is an image-text conversion relationship between the sample text and the sample image.

The second acquiring module 905 is configured to acquire an initial generative model.

The second processing module 906 is configured to obtain a predicted discrete encoded sequence corresponding to the sample text and a predicted discrete encoded sequence corresponding to the sample image by inputting the sample pairs into the initial generative model.

The training module 907 is configured to obtain an adjusted generative model by adjusting model parameters of the initial generative model based on a first difference between the predicted discrete encoded sequence corresponding to the sample text and the discrete encoded sequence sample corresponding to the sample image, and a second difference between the predicted discrete encoded sequence corresponding to the sample image and the discrete encoded sequence sample corresponding to the corresponding sample text.

The generative model is based on a parameter shared seqtoseq framework.

It is to be noted that the foregoing explanations of the method for generating a target object are also applied to an apparatus for generating a target object, which will not be repeated here.

With the apparatus for generating a target object according to embodiments of the disclosure, the first discrete encoded sequence corresponding to the original object is obtained by performing the discrete encoding on the original object. The original object is of an image type, a text type, or a text-image-combined type. The second discrete encoded sequence is obtained by inputting the first discrete encoded sequence into the generative model. The target object is generated based on the second discrete encoded sequence. The target object is of an image type or a text type. When the original object is of the image type, the target object is of the text type. When the original object is of the text type, the target object is of the image type. Thus, generation of an image from a text, the generation of a text from an image, the generation of an image from a combination of image and text, and the generation of a text from a combination of text and image may be achieved by the same generative model, which extends an application scope of the generative model.

According to the embodiment of the disclosure, the disclosure further provides an electronic device, a readable storage medium and a computer program product.

Figure 10:
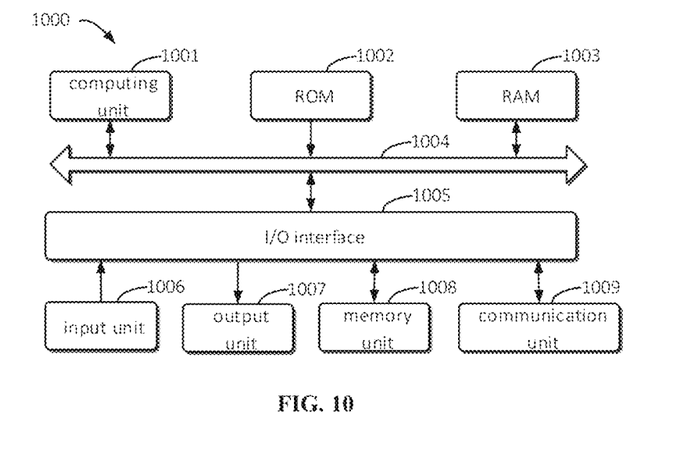
FIG. 10 is a block diagram illustrating an electronic device configured to implement a method for generating a target object according to embodiments of the disclosure.

FIG. 10 is a block diagram illustrating an example electronic device 1000 configured to implement the embodiment of the disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 10, the device 1000 includes a computing unit 1001, which may execute various appropriate actions and processing based on a computer program stored in a read-only memory (ROM) 1002 or a computer program loaded into a random access memory (RAM) 1003 from a storage unit 1008. In the RAM 1003, various programs and data required for operation of the device 1000 may also be stored. The computing unit 1001, the ROM 1002, and the RAM 1003 are connected to each other through a bus 1004. An input/output (I/O) interface 1005 is also connected to a bus 1004.

Several components in the device 1000 are connected to the I/O interface 1005, and include: an input unit 1006, for example, a keyboard, a mouse, etc.; an output unit 1007, for example, various types of displays, speakers, etc.; a storage unit 1008, for example, a magnetic disk, an optical disk, etc.; and a communication unit 1009, for example, a network card, a modem, a wireless communication transceiver, etc. The communication unit 1009 allows the device 1000 to exchange information/data with other devices over a computer network such as the Internet and/or various telecommunication networks.

The computing unit 1001 may be various general-purpose and/or special-purpose processing components with processing and computing capacities. Some examples of a computing unit 1001 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 1001 performs various methods and processing as described above, for example, a method for generating a target object. For example, in some embodiments, a method for generating a target object may be further implemented as a computer software program, which is physically contained in a machine readable medium, such as a memory unit 1008. In some embodiments, some or all of the computer programs may be loaded and/or mounted on the device 1000 via a ROM 1002 and/or a communication unit 1009. When the computer program is loaded on a RAM 1003 and performed by a computing unit 1001, one or more blocks in the above method for generating a target object may be performed. Alternatively, in other embodiments, a computing unit 1001 may be configured to perform a method for generating a target object in other appropriate ways (for example, by virtue of a firmware).

Various implementation modes of the systems and technologies described above may be implemented in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

The disclosure relates to a field of computer technologies, especially to a field of artificial intelligence (AI) technologies such as natural language processing (NLP) and deep learning (DL).

It should be noted that, Artificial intelligence (AI) is a subject that studies simulating certain thinking processes and intelligent behaviors (such as learning, reasoning, thinking, planning, etc.) of human beings by a computer, which covers hardware-level technologies and software-level technologies. AI hardware technologies generally include technologies such as sensors, dedicated AI chips, cloud computing, distributed storage, big data processing, etc.; AI software technologies mainly include computer vision technology, speech recognition technology, natural language processing (NLP) technology and machine learning (ML), deep learning (DL), big data processing technology, knowledge graph (KG) technology, etc.

With the technical solution according to embodiments of the disclosure, the first discrete encoded sequence corresponding to the original object is generated by performing discrete encoding on the original object. The original object is of an image type, a text type or a text-image-combined type. A second discrete encoded sequence is obtained by inputting the first discrete encoded sequence into the generative model. The target object is generated based on the second discrete encoded sequence. The target object is of an image type or a text type. When the original object is of the image type, the target object is of the text type. When the original object is of the text type, the target object is of the image type. Thus, generation of a text from an image, generation of an image from a text, generation of an image from a combination of text and image, and generation of a text from a combination of text and image may be achieved by the same generative model, which extends an application scope of the generative model.

It should be understood that, various forms of procedures shown above may be configured to reorder, add or delete blocks. For example, blocks described in the disclosure may be executed in parallel, sequentially, or in different orders, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for generating a target object, comprising:
generating a first discrete encoded sequence corresponding to an original object by performing discrete encoding on the original object, wherein, the original object is of an image type, a text type, or a text-image-combined type;
obtaining a second discrete encoded sequence by inputting the first discrete encoded sequence into a generative model; and
generating a target object based on the second discrete encoded sequence, wherein the target object is of an image type or a text type in a case of the original object being of the image type, the target object is of the text type, in a case of the original object being of the text type, the target object is of the image type, or in a case of the original object being of the text-image-combined type, the target object is of the image type or the text type;
wherein in a case where the original object is of the image type, obtaining the first discrete encoded sequence corresponding to the original object comprises:

converting a continuous code corresponding to the original object into a first continuous encoded vector by an encoder layer of a vector quantized—variational autoencoder (vg-vae);

converting the first continuous encoded vector into a first discrete encoded vector by nearest neighbor search based on a codebook in the vq-vae; and converting the first discrete encoded vector into the first discrete encoded sequence based on a preset discrete encoding method;

wherein in a case where the target object is of the text type, and generating the target object based on the second discrete encoded sequence comprises:

converting the second discrete encoded sequence into the target object based on a discrete decoding method corresponding to the preset discrete encoding method.

2. The method of claim 1, wherein a case where the original object is of the text type, generating the first discrete encoded sequence corresponding to the original object comprises:

converting the original object into the first discrete encoded sequence based on a preset discrete encoding method.

3. The method of claim 2, wherein in a case where the target object is of the image type, generating the target object based on the second discrete encoded sequence comprises:

converting the second discrete encoded sequence into a second discrete encoded vector based on a discrete decoding method corresponding to the preset discrete encoding method;

converting the second discrete encoded vector into a second continuous encoded vector by nearest neighbor search based on a codebook in a vector quantized— variational autoencoder (vq-vae); and generating the target object by converting the second continuous encoded vector into a continuous code corresponding to the target object through a decoder layer of the vq-vae.

4. The method of claim 1, wherein in a case where the original object is of the text-image-combined type, generating the first discrete encoded sequence corresponding to the original object comprises:

obtaining a third discrete encoded sequence by performing the discrete encoding on an image part of the original object;

obtaining a fourth discrete encoded sequence by performing the discrete encoding on a text part of the original object; and obtaining the first discrete encoded sequence by splicing the third discrete encoded sequence and the fourth discrete encoded sequence.

5. The method of claim 1, further comprising:

acquiring training data; wherein the training data comprises a plurality of sample pairs, each of the sample pairs comprises a discrete encoded sequence sample corresponding to a sample text and a discrete encoded sequence sample corresponding to a sample image, and there is an image-text conversion relationship between the sample text and the sample image;

acquiring an initial generative model;

obtaining a predicted discrete encoded sequence corresponding to the sample text and a predicted discrete encoded sequence corresponding to the sample image by inputting the sample pairs into the initial generative model; and obtaining a trained generative model by adjusting model parameters of the initial generative model based on a first difference between the predicted discrete encoded sequence corresponding to the sample text and the discrete encoded sequence sample corresponding to the sample image, and a second difference between the predicted discrete encoded sequence corresponding to the sample image and the discrete encoded sequence sample corresponding to the sample text.

6. The method of claim 1, wherein, the generative model is based on a parameter shared sequence to sequence framework.

7. An electronic device, comprising:

at least one processor; and a memory communicatively coupled to the at least one processor; wherein, the memory stores instructions executable by the at least one processor, and when the instructions are executed by the at least one processor, the at least one processor is configured to:

generate a first discrete encoded sequence corresponding to an original object by performing discrete encoding on the original object, wherein, the original object is of an image type, a text type, or a text-image-combined type;

obtain a second discrete encoded sequence by inputting the first discrete encoded sequence into a generative model; and generate a target object based on the second discrete encoded sequence, wherein the target object is of an image type or a text type, in a case of the original object being of the image type, the target object is of the text type, in a case of the original object being of the text type, the target object is of the image type, or in a case of the original object being of the text-image-combined type, the target object is of the image type or the text type;

wherein in a case where the original object is of the image type, the at least one processor is configured to:

convert a continuous code corresponding to the original object into a first continuous encoded vector by an encoder layer of a vector quantized—variational autoencoder (vq-vae);

convert the first continuous encoded vector into a first discrete encoded vector by nearest neighbor search based on a codebook in the vq-vae; and convert the first discrete encoded vector into the first discrete encoded sequence based on a preset discrete encoding method;

wherein in a case where the target object is of the text type, and the at least one processor is configured to:

convert the second discrete encoded sequence into the target object based on a discrete decoding method corresponding to the preset discrete encoding method.

8. The electronic device of claim 7, wherein in a case where the original object is of the text type, the at least one processor is configured to:

convert the original object into the first discrete encoded sequence based on a preset discrete encoding method.

9. The electronic device of claim 8, wherein in a case where the target object is of the image type, and the at least one processor is configured to:

convert the second discrete encoded sequence into a second discrete encoded vector based on a discrete decoding method corresponding to the preset discrete encoding method;

convert the second discrete encoded vector into a second continuous encoded vector by nearest neighbor search based on a codebook in a vector quantized—variational autoencoder (vq-vae); and generate the target object by converting the second continuous encoded vector into a continuous code corresponding to the target object through a decoder layer of the vq-vae.

10. The electronic device of claim 7, wherein in a case where the original object is of the text-image-combined type, the at least one processor is configured to:

obtain a third discrete encoded sequence by performing the discrete encoding on an image part of the original object;

obtain a fourth discrete encoded sequence by performing the discrete encoding on a text part of the original object; and obtain the first discrete encoded sequence by splicing the third discrete encoded sequence and the fourth discrete encoded sequence.

11. The electronic device of claim 7, wherein the at least one processor is configured to:

acquire training data; wherein the training data comprises a plurality of sample pairs, each of the sample pairs comprises a discrete encoded sequence sample corresponding to a sample text and a discrete encoded sequence sample corresponding to a sample image, and there is an image-text conversion relationship between the sample text and the sample image;

acquire an initial generative model;

obtain a predicted discrete encoded sequence corresponding to the sample text and a predicted discrete encoded sequence corresponding to the sample image by inputting the sample pairs into the initial generative model; and obtain a trained generative model by adjusting model parameters of the initial generative model based on a first difference between the predicted discrete encoded sequence corresponding to the sample text and the discrete encoded sequence sample corresponding to the sample image, and a second difference between the predicted discrete encoded sequence corresponding to the sample image and the discrete encoded sequence sample corresponding to the sample text.

12. The electronic device of claim 7, wherein, the generative model is based on a parameter shared sequence to sequence framework.

13. A non-transitory computer readable storage medium, having computer instructions stored thereon, wherein the computer instructions are configured to cause a computer to perform a method for generating a target object, the method comprising:

generating a first discrete encoded sequence corresponding to an original object by performing discrete encoding on the original object, wherein, the original object is of an image type, a text type, or a text-image-combined type;

obtaining a second discrete encoded sequence by inputting the first discrete encoded sequence into a generative model; and generating a target object based on the second discrete encoded sequence, wherein the target object is of an image type or a text type, in a case of the original object being of the image type, the target object is of the text type, in a case of the original object being of the text type, the target object is of the image type, or in a case of the original object being of the text-image-combined type, the target object is of the image type or the text type;

wherein in a case where the original object is of the image type, obtaining the first discrete encoded sequence corresponding to the original object comprises:

converting a continuous code corresponding to the original object into a first continuous encoded vector by an encoder layer of a vector quantized—variational autoencoder (vg-vae);

converting the first continuous encoded vector into a first discrete encoded vector by nearest neighbor search based on a codebook in the vg-vae; and converting the first discrete encoded vector into the first discrete encoded sequence based on a preset discrete encoding method;

wherein in a case where the target object is of the text type, and generating the target object based on the second discrete encoded sequence comprises:

converting the second discrete encoded sequence into the target object based on a discrete decoding method corresponding to the preset discrete encoding method.

14. The non-transitory computer readable storage medium of claim 13, wherein in a case where the original object is of the text-image-combined type, generating the first discrete encoded sequence corresponding to the original object comprises:

obtaining a third discrete encoded sequence by performing the discrete encoding on an image part of the original object;

obtaining a fourth discrete encoded sequence by performing the discrete encoding on a text part of the original object; and obtaining the first discrete encoded sequence by splicing the third discrete encoded sequence and the fourth discrete encoded sequence.

* * * * *